(12) United States Patent
Pacheco et al.

(10) Patent No.: US 11,332,982 B2
(45) Date of Patent: May 17, 2022

(54) FATIGUE REDUCING SHOULDERED CONNECTIONS

(71) Applicant: Coastal Pipe USA, L.L.C., Houston, TX (US)

(72) Inventors: Cain Pacheco, Houston, TX (US); Michael Sanders, Houston, TX (US)

(73) Assignee: Coastal Pipe USA, L.L.C., Houston, TX (US)

( * ) Notice: Subject to any disclaimer, the term of this patent is extended or adjusted under 35 U.S.C. 154(b) by 115 days.

(21) Appl. No.: 16/596,360

(22) Filed: Oct. 8, 2019

(65) Prior Publication Data

US 2020/0115965 A1 Apr. 16, 2020

Related U.S. Application Data

(60) Provisional application No. 62/743,931, filed on Oct. 10, 2018.

(51) Int. Cl.
*F16L 15/06* (2006.01)
*E21B 17/042* (2006.01)

(52) U.S. Cl.
CPC ............ *E21B 17/042* (2013.01); *F16L 15/06* (2013.01)

(58) Field of Classification Search
CPC ........ F16L 15/06; F16L 15/006; F16L 15/001
See application file for complete search history.

(56) References Cited

U.S. PATENT DOCUMENTS

| 6,254,146 | B1 * | 7/2001 | Church | F16L 15/06 285/334 |
| 6,447,025 | B1 * | 9/2002 | Smith | F16L 15/001 285/333 |
| 6,485,063 | B1 * | 11/2002 | Olivier | F16L 15/06 285/333 |
| 7,690,697 | B2 * | 4/2010 | Church | F16L 15/001 285/334 |
| 8,267,436 | B2 * | 9/2012 | Church | F16L 15/06 285/334 |
| 9,822,591 | B2 * | 11/2017 | Granger | E21B 17/0423 |
| 2006/0089976 | A1 * | 4/2006 | Breihan | F16L 15/001 709/218 |
| 2006/0214421 | A1 * | 9/2006 | Muradov | F16L 15/001 285/333 |
| 2011/0012347 | A1 * | 1/2011 | Pacheco | F16L 15/06 285/333 |
| 2013/0020072 | A1 * | 1/2013 | Leng | F16L 15/06 166/242.6 |
| 2014/0333065 | A1 * | 11/2014 | Pacheco | F16L 15/001 285/334 |

* cited by examiner

*Primary Examiner* — David Bochna
(74) *Attorney, Agent, or Firm* — Tumey L.L.P.

(57) ABSTRACT

A double shoulder threaded tool joint connection includes a pin with external threads formed between a pin external shoulder and a pin internal shoulder, the pin including a nose section between the pin internal shoulder and the pin external thread and a box with internal threads formed between a box external shoulder and a box internal shoulder. The internal threads and the external threads are arranged and designed for connection with each other so that the box and the pin are connected with a common center-line and with a primary seal formed by the pin external shoulder forced against the box external shoulder and a secondary seal formed between the pin internal shoulder forced again the box internal shoulder. The invention may be applied to any threaded joint.

5 Claims, 4 Drawing Sheets

FATIGUE REDUCING SHOULDERED CONNECTIONS

This application claims priority to U.S. provisional application Ser. No. 62/743,931 filed Oct. 10, 2018, the entire contents of which is incorporated herein by reference thereto.

BACKGROUND OF THE INVENTION

Field of the Invention

This invention is directed to a threaded joint for tubulars and other threaded joints.

Background of the Invention

In recent years, as the shallow wells have been prominent in the Oil and Gas drilling and exploration industry; drilling tubulars are put through highly deviated drilling programs and horizontal wells. As drilling tools are put through to the steep angle of these deviated wells, high bending stresses are induced in drilling tubulars that rotate within curved portions of the well. With these high bending stresses, the drilling tools rotary shoulder connections may develop fatigue cracks at their thread roots which can lead to washouts or twist-off failures. It has previously been established in conventional "V" threads that increasing the root radius or adding additional radii to the thread form root aids in reducing the peak stresses within the connection and critical areas. Most drilling tubular designers have designed connections to help in the reduction on the connection fatigue stresses at the roots of the drilling connection by applying this method.

In developing these new drilling connections, designers must undercut the threads to produce a larger root surface or to add multiple radii to achieve a large root surface. These undercuts may reduce the performance of the connection with the reduction in torque and or tensile capacity of the connection due to the geometry of the connection, which is highly affected by the thread form design.

Taking in mind the above current design status of the drill pipe connections in the existing market, there is a need to evolve the conventional "V" threads form to achieve not only a high level of fatigue resistance to bending stresses, but also to achieve higher torque and tensile requirements within the given design area and to provide a slim hole profile design in to minimize the well annular pressure loss and aid in the removal of cuttings and debris from the well.

In addition, it is also desirable to develop a threaded drilling connection that can interchange with other drilling connections that are existing in the market and improve on those existing drilling connections' fatigue performance characteristics by replacing the existing thread form with this new current thread form design.

BRIEF SUMMARY OF SOME OF THE PREFERRED EMBODIMENTS

The present invention relates to a fatigue reducing shouldered drilling connection thread form. More particularly, in certain embodiments, the present invention relates to threaded shouldered drilling connections comprising of multi-surface undercut thread roots.

In one embodiment, the present invention provides a double shoulder threaded drilling connection including a male or pin with external threads formed between a pin external shoulder and a pin internal shoulder, the pin having a nose section between the pin internal shoulder and the pin external threads; a female or box with internal threads formed between a box external shoulder and a box internal shoulder; wherein the internal threads and the external threads are arranged and designed for connection with each other so that the box and the pin are connected with a common center-line and with a primary seal formed by the pin external shoulder forced against the box external shoulder and a secondary seal formed between the pin internal shoulder forced against the box internal shoulder and wherein the external threads include stab and load flanks having flank angles that are about 29-31° measured from the thread axis and under-cut thread roots having 20°-25° under-cut root angles from the thread axis. The thread root has one large root radius or multiple small radii that are tangent to the undercut 20° angles and wherein the internal threads include stab and load flanks having flank angles that are about 29-31° measured from the thread axis and a single large root radius without any under-cut thread roots.

The features and advantages of the present invention will be readily apparent to those skilled in the art. While numerous changes may be made by those skilled in the art, such changes are within the spirit of the invention.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The present invention relates to a fatigue reducing shouldered drilling connection thread form. More particularly, in certain embodiments, the present invention relates to threaded drilling connections as seen in FIG. 1, comprising of multi-surface undercut thread roots 80.

Figure 1:
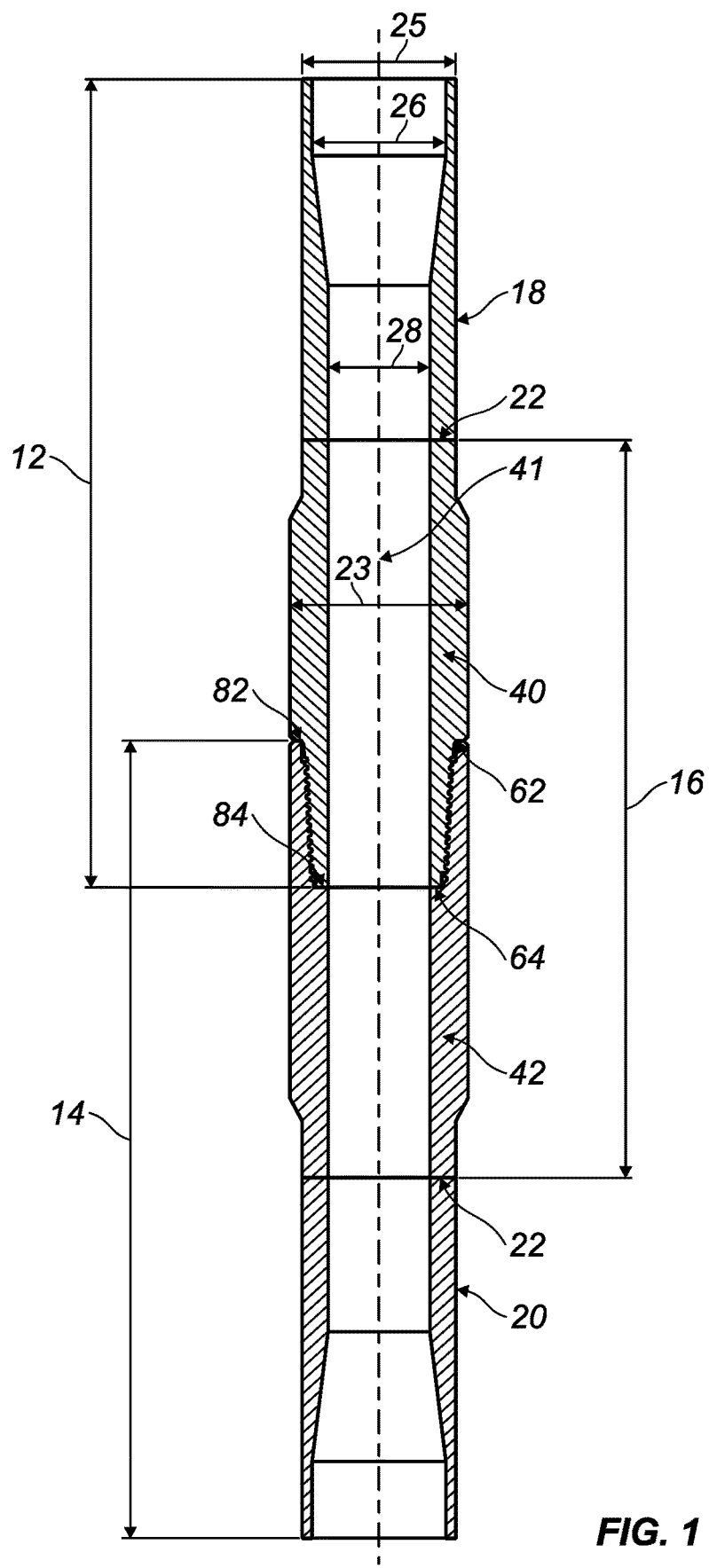
FIG. 1 is an illustration of a drill pipe comprising of a male and female tool joint assembly with an external mating shoulder and an internal mating shoulder in accordance with certain embodiments of the present disclosure.
Figure 2:
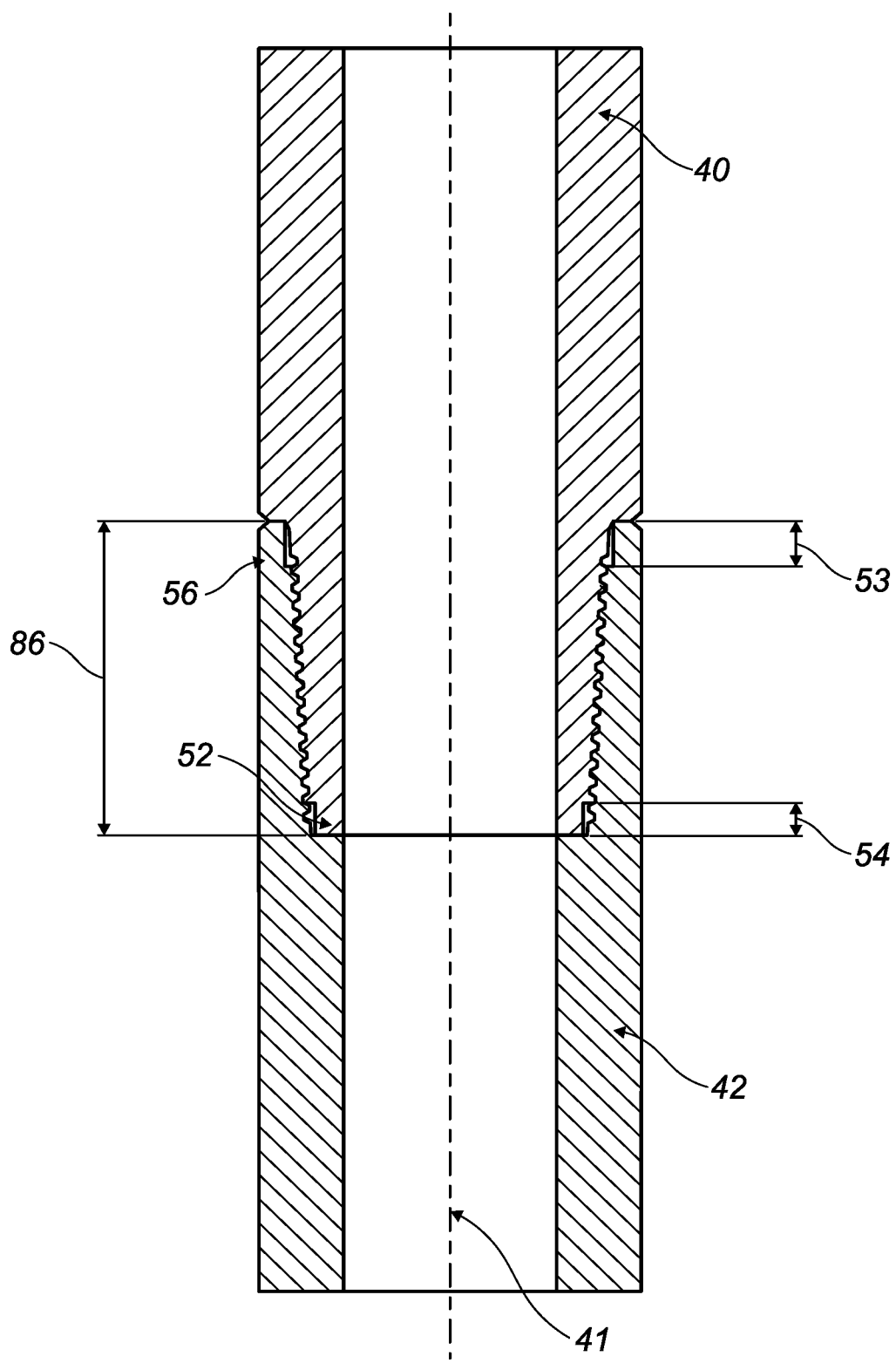
FIG. 2 is an illustration of a partial view of the threaded connection of two tool joints in accordance with certain embodiments of the present disclosure.

The current disclosure is aimed at evolving from a conventional "V" thread and moving on to a more fatigue reducing geometry thread form that will allow for larger root surface 66 as well as keeping the connections' male or pin 40 and female or box 42 members engaged at their critical load bearing contact areas 82, 84, 62, 64 as shown in FIG. 1 while a bending moment is being applied to the tool joint connection assembly 16. This design will also encompass high torsional and tensile capacity as well as reach a high level of fatigue cycles due to the geometry of the fatigue reducing thread form. The design may maintain minimal cross-sectional area at the connections critical design areas 56, 52. The threaded connections 40, 42 discussed herein may have threads that will be on a 1½" taper, 4 threads per inch, thread height of 0.0925", for example. There are several advantages of using the thread forms and threaded connections 40, 42 disclosed herein. One of the many advantages of the thread forms disclosed herein is that they provide for multi-surface undercut thread roots 66. This allows the threaded connections 40, 42 to flex and have a reduced stiffness ratio as compared close to the pipe body stiffness ratio.

Figure 5:
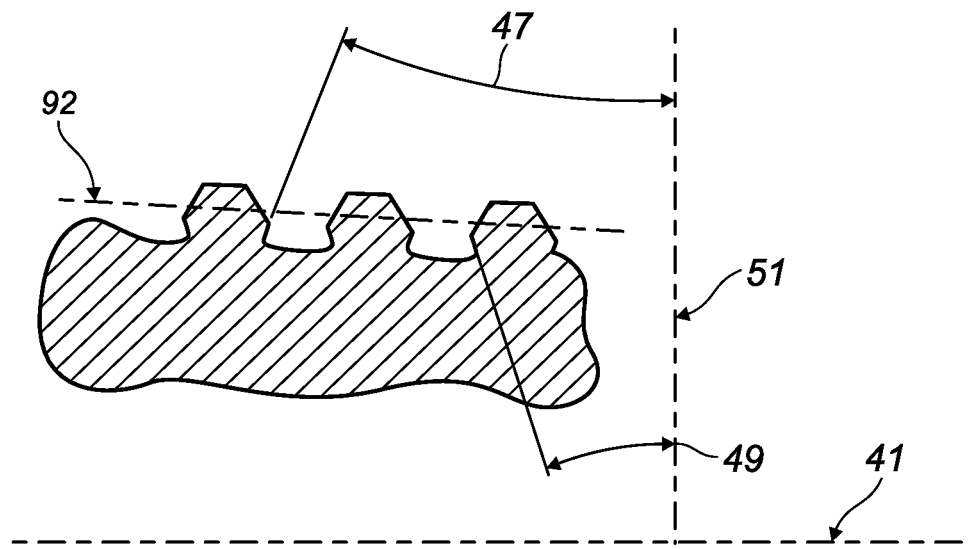
FIG. 5 is an illustration of a partial view of the fatigue reducing thread form of the external thread geometry at the root of the thread in accordance with certain embodiments of the present disclosure.
Figure 6:
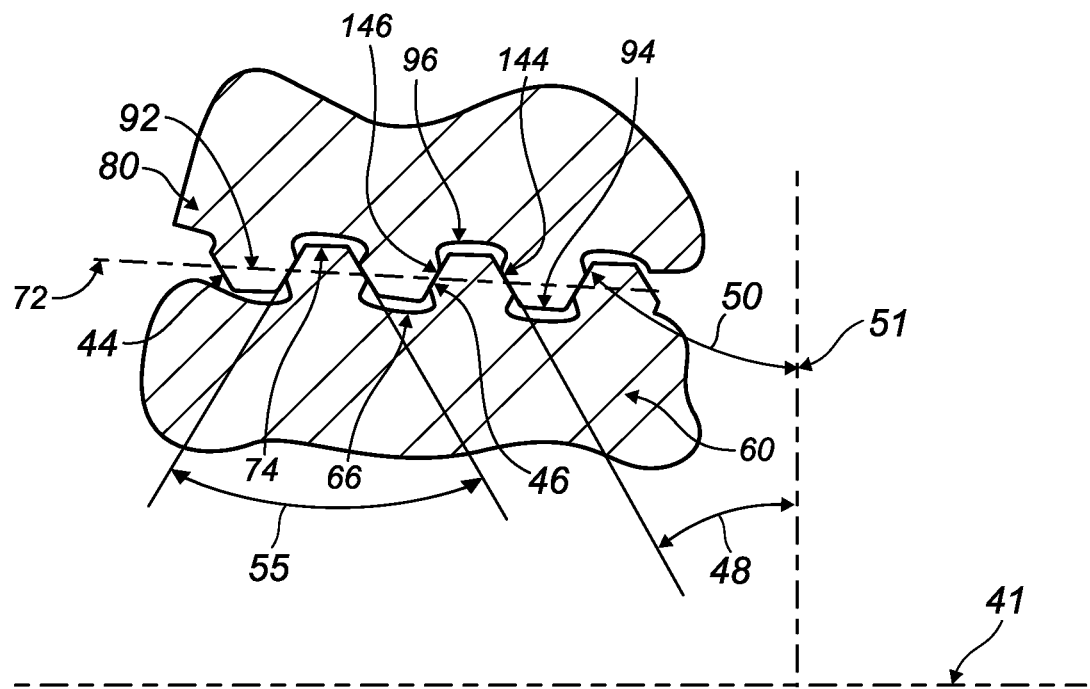
FIG. 6 is an illustration of a partial view of the fatigue reducing thread form of the external thread geometry and the internal thread geometry as they are engaged or assembled about the axis of the thread and in line with their similar pitch line in accordance with certain embodiments of the present disclosure.

Another advantage to the thread forms disclosed herein, that the external threads 60 compromise of a large root radii or surface 66. This is achieved by base stab flanks 44 and load flanks 46 having flank angles 48, 50 that are equal to 30° measured from the thread axis 51 and undercut thread root angles 47, 49 measuring 20°-25° from the thread axis 51 as shown in FIG. 5. The thread root has one large root radius 66 or multiple small radii that are tangent to the undercut 20° angles 47, 49 and wherein the internal threads 80 include stab flanks 44 and load flanks 46 having flank angles that are about 29-31° measured from the thread axis 51 and a single large root radius 96 without any under-cut thread roots as shown in FIG. 6.

Another advantage to the thread forms disclosed herein, is that they provide for an increased torque capacity. The thread forms described herein provide for a 6% to 25% increase in torque depending on the connection, all while maintaining the same connection length 86 and the same counterbore length 53 and pin nose length 54. The fatigue reducing thread form allows for more load flank 46 and stab flank 44 engagement which helps with gaining more surface area at 82, 84, 62, 64 for torque. This in turn allows for a shorter connection length 86 with the same shear strength to withstand any thread shear due to torque and allow for the connection to remain engaged under severe bending moments or dog leg severities.

Another advantage to the thread forms 60, 80 disclosed herein, is that they provide a reduced stress concentration factor below 1.0 as compared to the pipe tension capacity of 2.2.

Another advantage to the thread forms disclosed herein, is that they interchange with other connections in the field and improve on those existing drilling connections' fatigue performance characteristics by replacing the existing thread form with this new current thread form design 60, 80. The tool joint assembly 16 having centerline 41, an outer diameter 23 and an inner diameter 28 of the same size as the interchanging existing drilling connections can be welded at 22 to a similar drilling tubular having the same outer diameter 25 and inner diameter 26, with similar upset sections 18, 20 of drilling tubulars 12, 14.

In certain embodiments, the present disclosure provides for a double shoulder tool joint connection 16, where the connections will have external mating shoulders 62, 82 and internal mating shoulders 64, 84. This will aid in producing additional surface area for the higher torque requirements. FIG. 1 illustrates a view of a male tool joint 40 and female tool joint 42 assembly 16 with external mating shoulders 62, 82 and internal mating shoulders 64, 84 in accordance with certain embodiments of the present disclosure.

Figure 3:
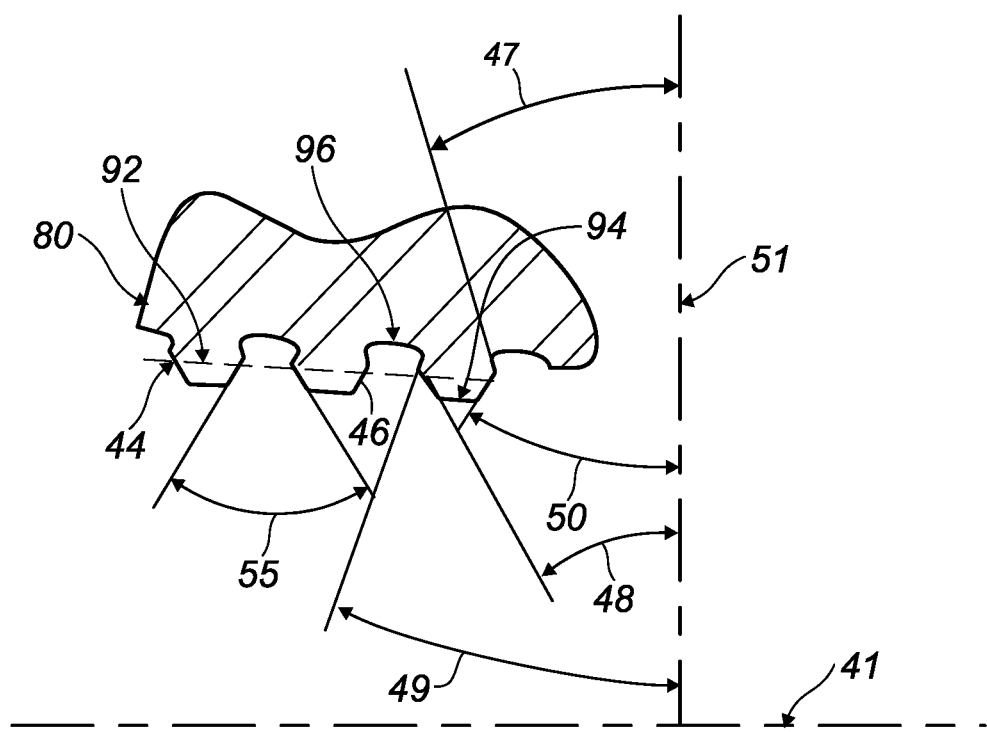
FIG. 3 is an illustration of a partial view of the fatigue reducing thread form of the internal thread geometry in accordance with certain embodiments of the present disclosure.
Figure 4:
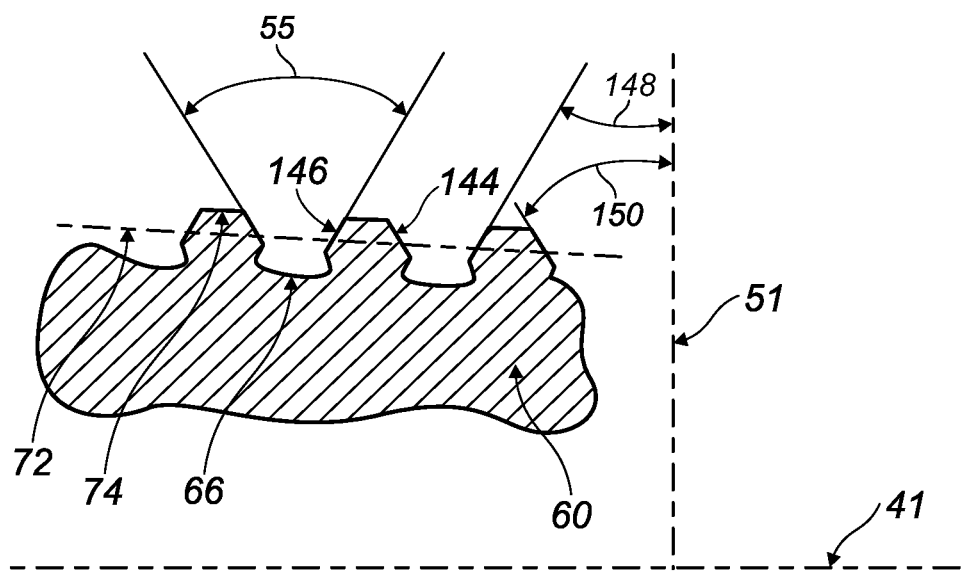
FIG. 4 is an illustration of a partial view of the fatigue reducing thread form of the external thread geometry in accordance with certain embodiments of the present disclosure.

FIG. 3 to FIG. 5 illustrate a partial view of the fatigue reducing thread form of the internal 80 and external 60 thread geometry in accordance with certain embodiments of the present disclosure.

In certain embodiments, the thread forms 60, 80 of the present disclosure may comprise an external or male thread form 60 having a stab flank 144 angle from about 29° to about 31° from the thread axis 51, as shown in FIG. 4. In certain embodiments, as shown in FIG. 4, the external or male thread form 60 may have a load flank 146 angle of about 29-31° from the thread axis 51. Additionally, in certain embodiments, as shown in FIG. 5, the external or male thread form 60 may have undercut thread roots 47, 49 having about 20°-25° undercut root angles from the thread axis 51. The thread root 66 having one large root radius or multiple small radii that are tangent to the undercut 20° angles 47, 49.

In certain embodiments, the thread forms 60, 80 of the present disclosure may comprise an internal or female thread form 80 having a stab flank 44 angle of from about 29° to about 31° from the thread axis 51, as shown in FIG. 3. In certain embodiments, as shown in FIG. 3, the internal or female thread form 80 may have a load flank 46 angle of about 29-31° from the thread axis. Additionally, in certain embodiments, as shown in FIG. 3, the internal or female thread form 80 may have undercut thread roots 47, 49 having about 20°-25° undercut root angles from the thread axis 51. The thread root 96 having one large root radius or multiple small radii that are tangent to the undercut angles 47, 49 of about 20-25°.

In certain embodiments, the thread form 60 may have supplementary radii at all corners to reduce any stress risers that could occur due to the bending loads.

As shown in FIG. 6, when the tool joints 16 are assembled, the thread roots 96, 66 and thread crest 74, 94 will not be in engagement. The root surface 66 and 96 may still have a small flat area that is parallel to the pitch line 72, 92 of the threads. The thread will have an undercut area created by angles 47, 49 that will help in increasing the root surface 66 and 96 but will not diminish the performance from the threaded connection 40, 42.

Although the present invention and its advantages have been described in detail, it should be understood that various changes, substitutions and alterations may be made herein without departing from the spirit and scope of the invention as defined by the appended claims.

What is claimed is:

1. A double shoulder threaded tool joint connection comprising:
 a pin with external threads formed between a pin external shoulder and a pin internal shoulder, the pin having a nose section between the pin internal shoulder and the pin external threads;
 a box with internal threads formed between a box external shoulder and a box internal shoulder;
 wherein the internal threads and the external threads comprise a fatigue reducing geometry, and are arranged and designed for connection with each other so that the box and the pin are connected with a common center-line and with a primary seal formed by the pin external shoulder forced against the box external shoulder and a secondary seal formed between the pin internal shoulder forced again the box internal shoulder;
 wherein the fatigue reducing geometry of the internal threads and the external threads includes stab flanks having stab flank angles of about 29-31° measured from the thread axis and load flanks having load flank angles of about 29-31° measured from the thread axis; and
 wherein the fatigue reducing geometry of the internal threads and the external threads includes undercut thread roots at both the stab flanks and load flanks having 20-25° undercut root angles measured from the thread axis.

2. The double shoulder threaded tool joint connection of claim 1, wherein the internal and external threads further comprise root surfaces that are parallel with a common center-line.

3. The double shoulder threaded tool joint connection of claim 1, wherein the internal and external threads further comprise thread roots and thread crests that are not in engagement.

4. The double shoulder threaded tool joint connection of claim 1, further comprising supplemental radii at all corners.

5. The double shoulder threaded tool joint connection of claim 1, further comprising interchangeability to other connections having a like taper, threads per inch, and thread height.

* * * * *